(12) United States Patent
Mori

(10) Patent No.: US 10,105,696 B2
(45) Date of Patent: Oct. 23, 2018

(54) HONEYCOMB STRUCTURE

(71) Applicant: NGK INSULATORS, LTD., Nagoya (JP)

(72) Inventor: Kazuya Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 291 days.

(21) Appl. No.: 15/062,537

(22) Filed: Mar. 7, 2016

(65) Prior Publication Data

US 2016/0263567 A1    Sep. 15, 2016

(30) Foreign Application Priority Data

Mar. 13, 2015    (JP) ................. 2015-050711

(51) Int. Cl.
| | |
|---|---|
| *B32B 3/12* | (2006.01) |
| *B01J 35/04* | (2006.01) |
| *B01D 46/24* | (2006.01) |
| *F01N 3/022* | (2006.01) |
| *F01N 3/035* | (2006.01) |

(52) U.S. Cl.
CPC ............ *B01J 35/04* (2013.01); *B01D 46/247* (2013.01); *B01D 46/2459* (2013.01); *F01N 3/0222* (2013.01); *F01N 3/035* (2013.01); *B01D 2046/2481* (2013.01); *F01N 2330/34* (2013.01)

(58) Field of Classification Search
None
See application file for complete search history.

(56) References Cited

U.S. PATENT DOCUMENTS

| | | |
|---|---|---|
| 9,080,484 B2 | 7/2015 | Miyairi |
| 2014/0298779 A1 | 10/2014 | Miyairi |

FOREIGN PATENT DOCUMENTS

| | | |
|---|---|---|
| DE | 103 30 680 A1 | 7/2004 |
| JP | 2014-200741 A1 | 10/2014 |

OTHER PUBLICATIONS

German Office Action (Application No. 10 2016 002 709.6) dated Dec. 2, 2016 (with English translation).

*Primary Examiner* — Daniel J. Schleis
(74) *Attorney, Agent, or Firm* — Burr & Brown, PLLC

(57) ABSTRACT

A honeycomb structure includes: a honeycomb structure body which includes a porous partition wall defining a plurality of cells extending from an inflow end face to an outflow end face; an inflow side plugging portion; and an outflow side plugging portion, in which the plurality of cells includes an outflow cell having a quadrangle shape in a cross-section, an inflow cell having a pentagonal or hexagonal shape in a cross-section and being formed adjacently around the outflow cell with the partition wall defining the outflow cell while surrounding the outflow cell interposed therebetween, and in a cross-section orthogonal to the extension direction of the cell, a value of a ratio of a distance Y with respect to a distance X is 1.1 to 1.8.

11 Claims, 4 Drawing Sheets

HONEYCOMB STRUCTURE

The present application is an application based on JP-2015-050711 filed on Mar. 13, 2015 with Japan Patent Office, the entire contents of which are incorporated herein by reference.

BACKGROUND OF THE INVENTION

Field of the Invention

The present invention relates to a honeycomb structure. More specifically, the invention relates to a honeycomb structure capable of preventing a breakage caused by thermal stress while having a low pressure loss at an initial timing and a timing in which a large amount of particulate matter such as soot or ash is accumulated and accumulating a large amount of particulate matter such as soot or ash.

Description of the Related Art

Hitherto, a converter obtained by coating a three-way catalyst on a honeycomb structure has been used to remove CO, HC, and $NO_x$ (removal of toxic elements) in an exhaust gas of a gasoline engine. Then, it is most effective to use the converter in order to remove toxic elements. However, a direct fuel injection type gasoline engine is used from the viewpoint of reducing the amount of $CO_2$. The direct fuel injection type gasoline engine has a problem in which exhaust particulates are emitted. For this reason, a sufficient effect cannot be obtained by the existing converter.

Further, a diesel engine has an excellent thermal efficiency compared with the gasoline engine. Thus, there is an advantage that the diesel engine can be appropriately used as an automobile engine that reduces the amount of $CO_2$ as a countermeasure for global warming. Meanwhile, the diesel engine has a problem in which particulates are generated due to a diffusing combustion. Since the particulates cause a cancer, it is essential to prevent the particulates from being emitted to the atmosphere. For that reason, there is currently a strict regulation that regulates the number of particulates in addition to the regulation of the particulate emission amount based on the weight of the related art.

Here, there is a limitation in the reduction of the particulate emission amount caused by the improvement in combustion. Nowadays, only one effective method is to install a filter in an exhaust system. As the filter, a wall flow type filter that is designed to cause a gas to pass through a porous partition wall is effective. That is, there is proposed a honeycomb structure which includes a plurality of cells as a most effective measure at present. Here, the cells of the honeycomb structure capable of using the surface of the partition wall as a filtration area are formed so that an inflow end face and an outflow end face are alternately plugged and an exhaust gas flows through the partition wall so as to trap particulates. Here, the honeycomb structure is most effective currently. However, the honeycomb structure (the wall flow type filter) has a problem in which a filtration rate needs to be decreased in order to reduce the pressure loss within an allowable range.

For that reason, such a wall flow type filter is used to reduce a pressure loss when a large amount of particulate matter (PM) such as soot or ash is accumulated (in a PM accumulation state). Here, a problem arises in that the initial pressure loss increases when the filtration area or the open frontal area of the cell at the side of the inflow end face is increased.

Further, the wall flow type filter generates locally excessive heat when the accumulated soot is burned. In that case, a crack is generated due to the generated heat.

To solve such a problem, there is proposed a filter that suppresses both an initial pressure loss and a pressure loss in a PM accumulation state, prevents excessive heat locally generated inside the filter during the combustion of soot, and reduces a crack caused by thermal stress (see Patent Document 1).

[Patent Document 1] JP-A-2014-200741

SUMMARY OF THE INVENTION

The filter (the honeycomb structure) disclosed in Patent Document 1 has an effect that particulate matter can be efficiently trapped and removed and the pressure loss at the initial timing and the PM accumulation timing is low when the filter is used in the automobile. Meanwhile, since a truck or an off-road vehicle is used in a usage environment different from that of the automobile, the above-described effect cannot be sufficiently obtained when the filter is used in the truck or the off-road vehicle.

Specifically, ash of particulate matter cannot be removed by the combustion in the traveling mode. Particularly, the truck or the off-road vehicle has a long traveling distance (that is, the filter operation time is long) compared with the automobile and the honeycomb structure needs to be subjected to a cleaning treatment in order to periodically remove ash accumulated inside the honeycomb structure (the filter). When the cleaning treatment is not performed, the pressure loss of the honeycomb structure increases due to the accumulation of ash. For that reason, it is desirable to clean the honeycomb structure at a long time interval in case of the truck or the off-road vehicle. That is, it is desirable to reduce the pressure loss in the ash accumulation state and to clean ash at a long time interval. Then, in order to meet such a demand, there is a need to increase the ash accumulation volume in the honeycomb structure. Meanwhile, the truck or the off-road vehicle has a limited space for mounting a post-processing device. Accordingly, it is important that the filter has a large ash accumulation volume while having a small size so that the ash cleaning treatment can be performed at a long time interval. Thus, there is a tendency that the truck or the off-road vehicle cannot sufficiently have the above-described effect.

Here, there has been a demand for the development of the filter dedicated for the truck or the off-road vehicle having the same effect as the automobile.

The invention is made in view of these problems of the related art. An object of the invention is to provide a honeycomb structure capable of preventing a crack while having a low pressure loss at an initial timing and a PM accumulation timing and accumulating a large amount of soot or ash.

According to the invention, a honeycomb structure below is provided.

According to a first aspect of the present invention, a honeycomb structure including is provided: a honeycomb structure body which includes a porous partition wall defining a plurality of cells as fluid channels extending from an inflow end face as one end face to an outflow end face as the other end face; an inflow side plugging portion which is disposed in an end at the side of the inflow end face of a predetermined cell; and an outflow side plugging portion which is disposed in an end at the side of the outflow end face of a residual cell, wherein the plurality of cells includes an outflow cell having the inflow side plugging portion disposed therein and an inflow cell having the outflow side plugging portion disposed therein, a cross-section orthogonal to the extension direction of the cell in the outflow cell is quadrangle, the inflow cell is disposed so as to surround the entire circumference of the outflow cell and a cross-section orthogonal to the extension direction of the cell is pentagonal or hexagonal, and when a distance X indicates a short distance between the facing partition walls among the partition walls defining one outflow cell and a distance Y indicates a distance between the partition walls defining the adjacent outflow cells while the partition walls face each other in a cross-section orthogonal to the extension direction of the cell, a value of a ratio of the distance Y with respect to the distance X is 1.1 to 1.8.

According to a second aspect of the present invention, the honeycomb structure according to the first aspect is provided, wherein a cross-section orthogonal to the extension direction of the cell in the inflow cell is pentagonal.

According to a third aspect of the present invention, the honeycomb structure according to the first or second aspects is provided, wherein a cross-section orthogonal to the extension direction of the cell in the outflow cell is square.

According to a fourth aspect of the present invention, the honeycomb structure according to any one of the first to third aspects is provided, wherein an open frontal area of the inflow cell is 60% or more.

According to a fifth aspect of the present invention, the honeycomb structure according to any one of the first to fourth aspects is provided, wherein a hydraulic diameter of the outflow cell is 1.1 mm or more.

According to a sixth aspect of the present invention, the honeycomb structure according to any one of the first to fifth aspects is provided, wherein the distance X is 1.2 mm to 2.4 mm.

According to a seventh aspect of the present invention, the honeycomb structure according to any one of the first to sixth aspects is provided, wherein a catalyst is loaded on the partition wall.

In the honeycomb structure of the invention, the outflow cell and the inflow cell each having a predetermined shape are disposed according to a specific pattern and a value of a ratio of the distance Y with respect to the distance X is 1.1 to 1.8. With such a configuration, in the honeycomb structure of the invention, the pressure loss is low at the initial timing and a timing in which a large amount of particulate matter such as soot or ash is accumulated (in a PM accumulation state). Further, the honeycomb structure of the invention can accumulate a large amount of particulate matter such as soot or ash. Further, the honeycomb structure of the invention can prevent a breakage (a generation of crack) caused by thermal stress.

DESCRIPTION OF THE PREFERRED EMBODIMENTS

Hereinafter, embodiments of the invention will be described. The invention is not limited to the embodiments below, and the embodiments can be appropriately modified and improved and the like based on the general knowledge of the person skilled in the art without departing from the spirit of the invention. Of course, these modifications and improvements are also included in the scope of the invention.

Figure 1:
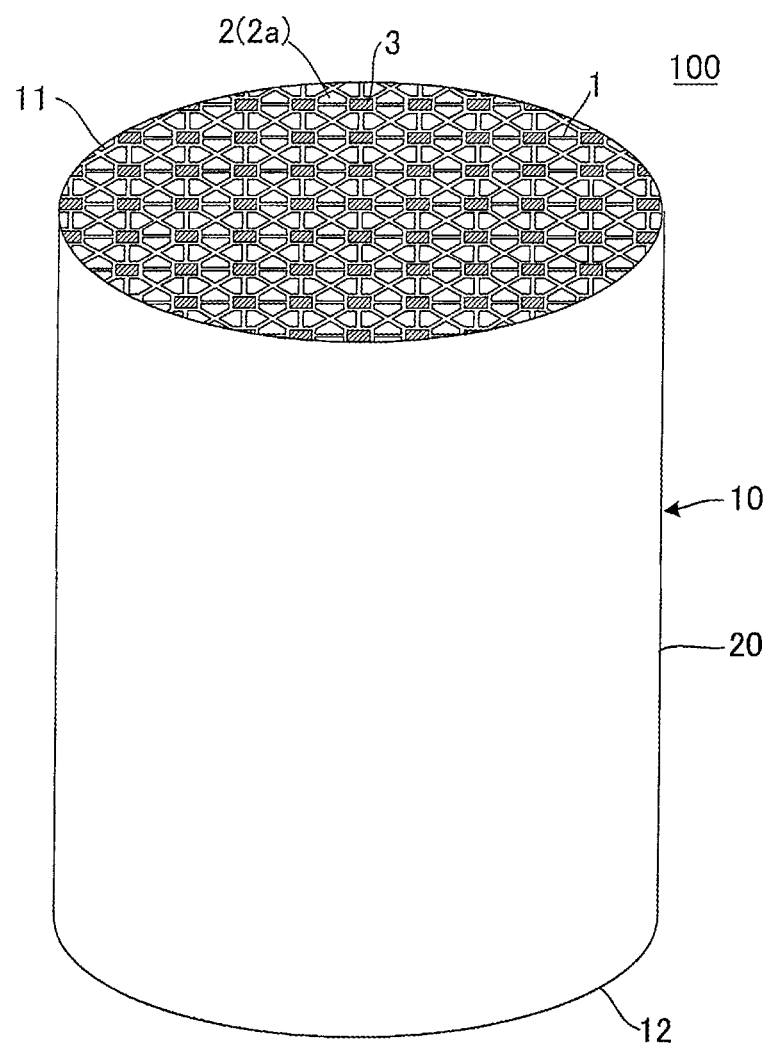
FIG. 1 is a schematic perspective view showing a honeycomb structure according to an embodiment of the invention.
Figure 2:
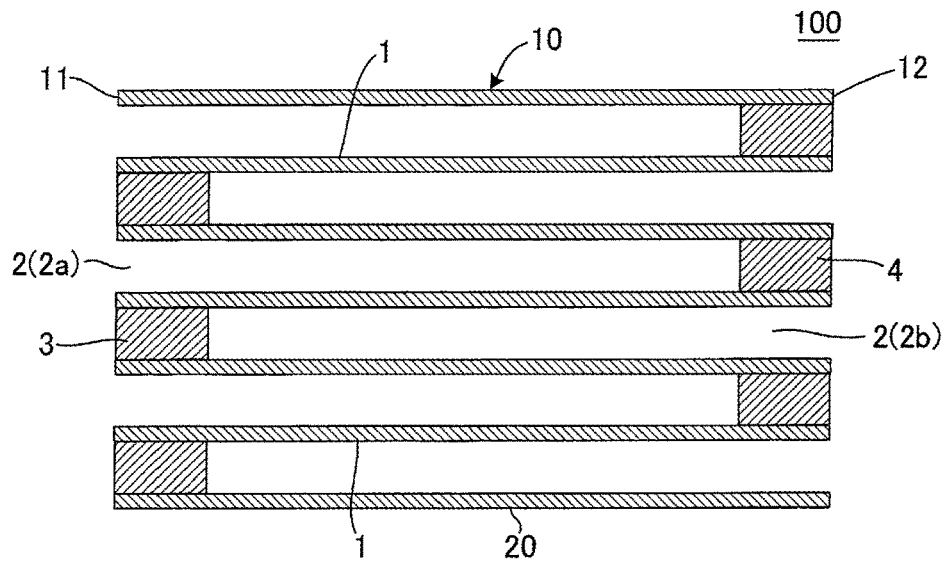
FIG. 2 is a schematic cross-sectional view showing a cross-section parallel to the extension direction of a cell of the honeycomb structure according to the embodiment of the invention.

[1] Honeycomb Structure:

A honeycomb structure according to an embodiment of the invention is a honeycomb structure 100 shown in FIGS. 1 and 2. The honeycomb structure 100 includes a honeycomb structure body 10 which includes a porous partition wall 1 defining a plurality of cells 2, an inflow side plugging portion 3 which is disposed at the end which is at the side of an inflow end face 11 of a predetermined cell 2, and an outflow side plugging portion 4 which is disposed at the end which is at the side of an outflow end face 12 of a residual cell 2. The partition wall 1 is formed as a fluid channel extending from the inflow end face 11 as one end face to the outflow end face 12 as the other end face. The plurality of cells 2 include an outflow cell 2b in which the inflow side plugging portion 3 is disposed and an inflow cell 2a in which the outflow side plugging portion 4 is disposed. The outflow cell 2b is formed in a quadrangle shape (a quadrangle cross-sectional shape) in a cross-section orthogonal to the extension direction of the cell 2. Further, the inflow cell 2a is disposed so as to surround the entire circumference of the outflow cell 2b and is formed in a pentagonal shape or a hexagonal shape in a cross-section orthogonal to the extension direction of the cell 2 (see FIGS. 3 and 4). Then, the honeycomb structure 100 is formed so that a ratio of a distance Y with respect to a distance X in a cross-section orthogonal to the extension direction of the cell 2 is 1.1 to 1.8. The distance X indicates a short distance between the facing partition walls 1 among the partition walls 1 defining one outflow cell 2b. The distance Y indicates a distance between the partition walls 1 defining the adjacent outflow cells 2b while the partition walls 1 face each other.

In such a honeycomb structure 100, the outflow cell 2b and the inflow cell 2a each having a predetermined shape are disposed according to a specific pattern and a ratio of the distance Y with respect to the distance X is 1.1 to 1.8. For that reason, the honeycomb structure 100 has a feature that the initial pressure loss is low and the pressure loss obtained when a large amount of particulate matter such as soot or ash is accumulated is low. Further, the honeycomb structure 100 can accumulate a large amount of particulate matter such as soot or ash. Further, since the honeycomb structure 100 employs the above-described configuration, a breakage caused by thermal stress is prevented. In addition, the "initial pressure loss" indicates a pressure loss obtained when soot of 1 g or less (1 g/L) is accumulated per 1 L in the honeycomb structure in the specification.

The honeycomb structure 100 has a large volume capable of accumulating particulate matter such as ash. For that reason, the honeycomb structure 100 can perform a cleaning treatment for particulate matter such as ash at a long time interval. As a result, the honeycomb structure 100 can be satisfactorily used as a filter of a vehicle such as a truck or an off-road vehicle in which a traveling distance is long compared with an automobile.

Figure 3:
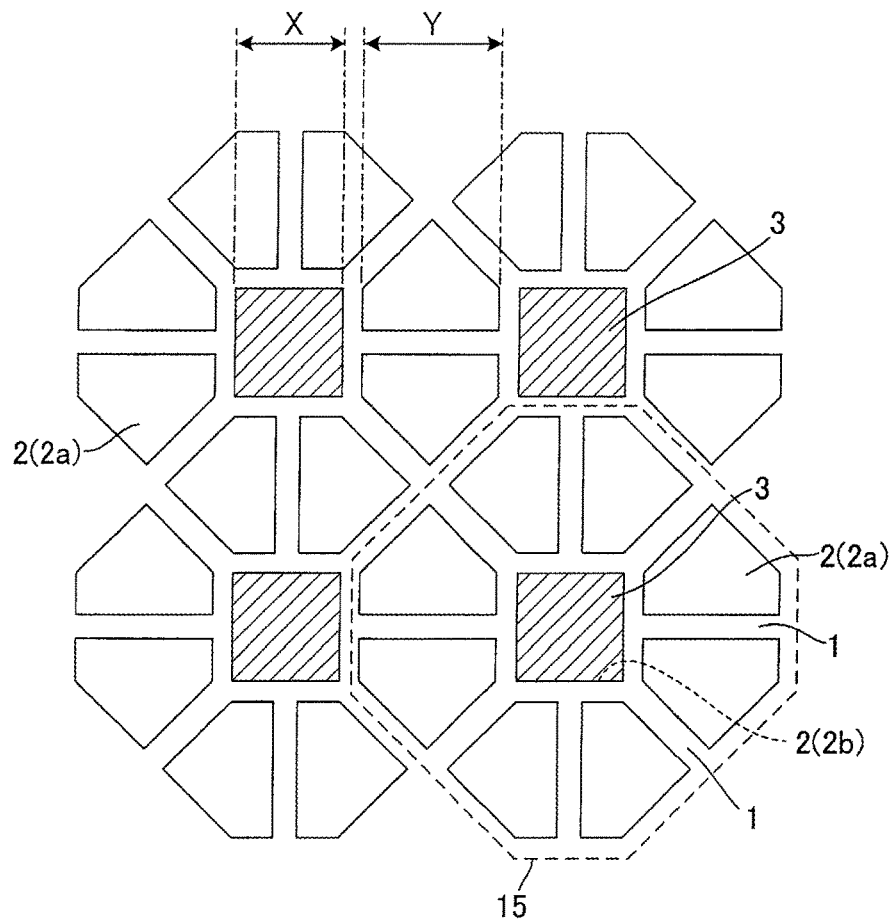
FIG. 3 is a schematic plan view showing an enlarged cell of one end face of the honeycomb structure shown in FIG. 1.
Figure 4:
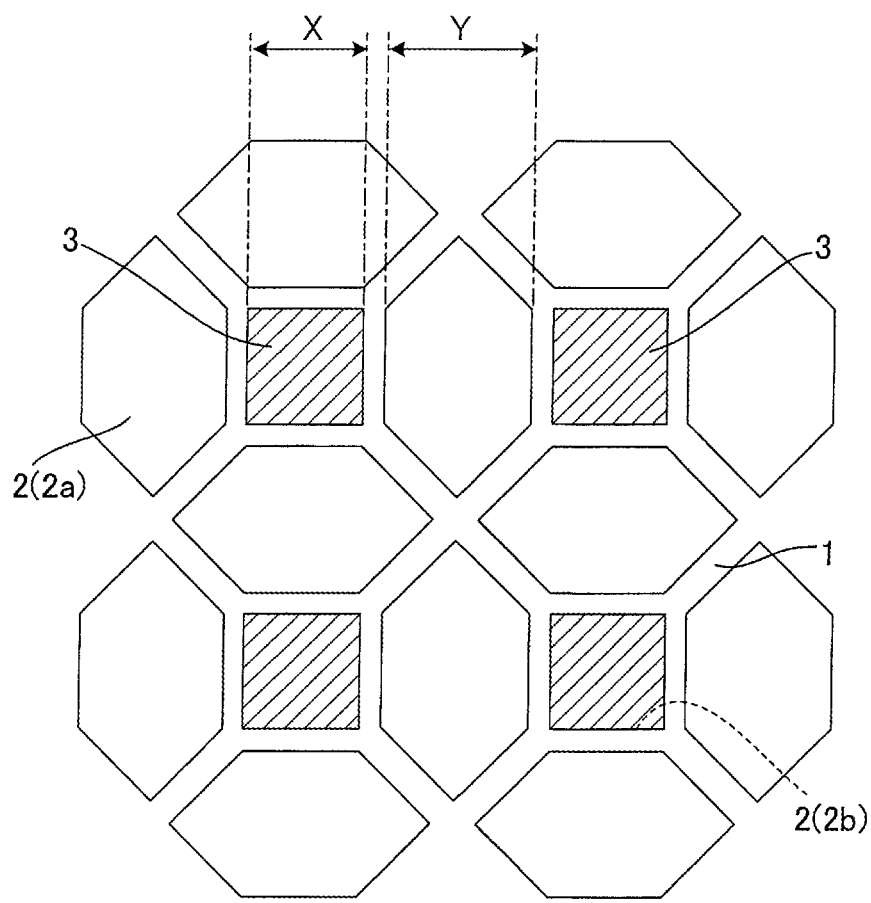
FIG. 4 is a schematic plan view corresponding to FIG. 3 and showing an enlarged cell of one end face of a honeycomb structure according to another embodiment of the invention.

FIG. 1 is a schematic perspective view showing a honeycomb structure according to an embodiment of the invention. FIG. 2 is a schematic cross-sectional view showing a cross-section parallel to the extension direction of the cell of the honeycomb structure according to the embodiment of the invention. FIG. 3 is a schematic plan view showing an enlarged cell of one end face of the honeycomb structure shown in FIG. 1. FIG. 4 is a schematic plan view corresponding to FIG. 3 and showing an enlarged cell of one end face of a honeycomb structure according to another embodiment of the invention.

[1-1] Honeycomb Structure Body:

The plurality of cells 2 formed in the honeycomb structure body 10 include the inflow cell 2a into which an exhaust gas flows and the outflow cell 2b from which an exhaust gas flows. The honeycomb structure of the invention is formed so that an inflow cell having a pentagonal or hexagonal cross-section and an outflow cell having a quadrangle cross-section are disposed at a predetermined positional relation.

Figure 5:
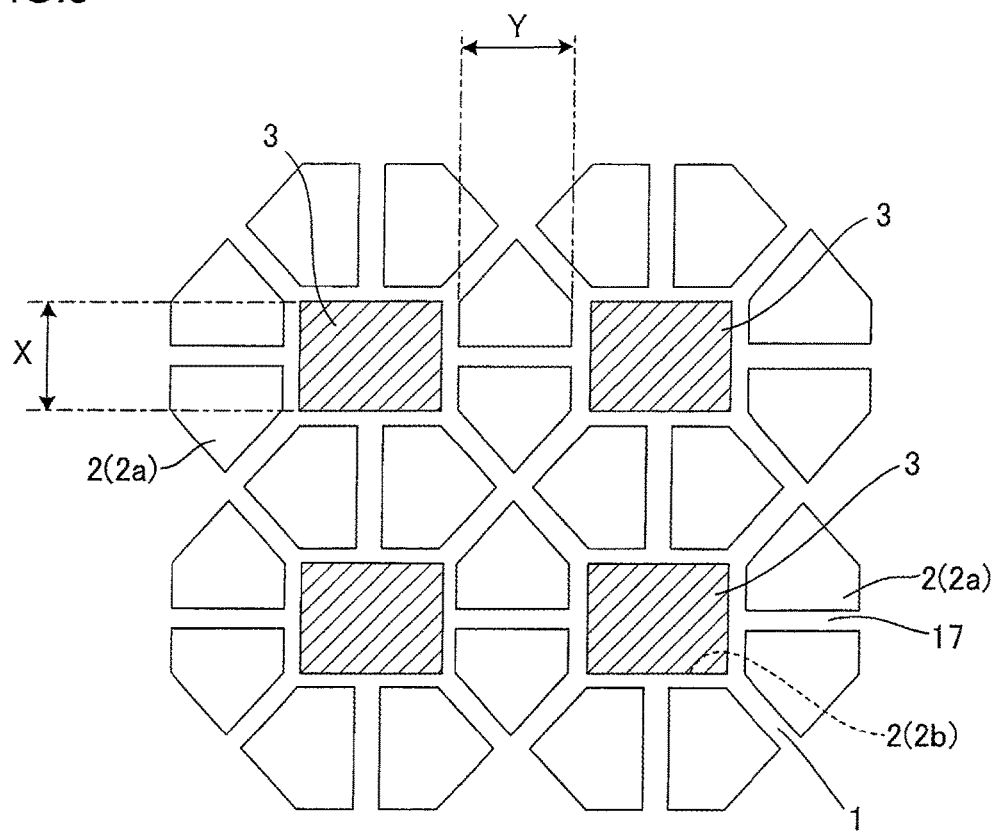
FIG. 5 is a schematic plan view corresponding to FIG. 3 and showing an enlarged cell of one end face of a honeycomb structure according to still another embodiment of the invention.

The outflow cell 2b has a quadrangle cross-sectional shape. With such a shape, the open frontal area of the outflow cell 2b can be increased. In addition, it is desirable that the cross-sectional shape of the outflow cell 2b be rectangular or square. Among these, a square shape is more desirable. In the square shape, the open frontal area of the outflow cell can be further increased. In the rectangular shape, it is desirable that a value of a ratio of a long-side length with respect to a short-side length be larger than 1.0 and equal to or smaller than 1.2. As will be described later, when the ratio exceeds the upper limit value, there is a possibility that the shape of the honeycomb formed body may not be easily maintained when the honeycomb formed body is formed by extrusion or the like. FIG. 5 shows an example in which the outflow cell 2b having a rectangular cross-section and the inflow cell 2a having a pentagonal cross-section are disposed. The inflow cell 2a is disposed so as to surround the entire circumference of the outflow cell 2b in a cross-section orthogonal to the extension direction of the cell 2. Further, the inflow cell 2a having a pentagonal cross-section is formed in which the inflow cell 2a having a hexagonal cross-section is divided into two parts by a defining wall 17 (the partition wall 1). FIG. 5 is a schematic plan view corresponding to FIG. 3 and showing an enlarged cell of one end face of a honeycomb structure according to still another embodiment of the invention.

As shown in FIG. 1, it is desirable to dispose the outflow cells 2b lengthwise and breadthwise while the partition walls 1 face each other. Then, the inflow cell 2a and the outflow cell 2b are disposed adjacently to each other with the partition wall 1 defining these cells (the inflow cell 2a and the outflow cell 2b) interposed therebetween.

The inflow cell 2a has a pentagonal or hexagonal cross-section. With such a shape, a filtration area of a filter in the honeycomb structure can be increased. For that reason, the pressure loss obtained when PM is accumulated can be reduced.

As shown in FIG. 4, the honeycomb structure body 10 is formed so that the plurality of inflow cells 2a is formed adjacently around the outflow cell 2b with the partition wall 1 defining the outflow cell 2b while surrounding the outflow cell 2b interposed therebetween. That is, the inflow cell 2a always exists around each outflow cell 2b. In addition, it is desirable that one cell group 15 which includes one outflow cell 2b and the plurality of inflow cells 2a surrounding the outflow cell 2b have an octagonal shape in a cross-section (a cross-sectional shape) orthogonal to the extension direction of the cell 2. Then, it is desirable to dispose the inflow cells 2a each having a hexagonal cross-section formed around the outflow cell 2b having a quadrangle cross-section so that the longest diagonal line thereof is parallel to one side of the outflow cell 2b. In addition, it is desirable to obtain the inflow cell 2a having a pentagonal cross-section by dividing the inflow cell 2a having a hexagonal cross-section into two parts by the defining wall 17 (the partition wall 1). It is desirable that the defining wall 17 is a wall formed uprightly and perpendicularly from the center of the "partition wall 1 defining the outflow cell 2b" in the cross-section orthogonal to the extension direction of the cell 2.

The inflow cell 2a may be formed in a pentagonal shape or a hexagonal shape in a cross-section orthogonal to the extension direction of the cell 2. However, it is desirable to form the inflow cell 2a in a pentagonal shape in a cross-section orthogonal to the extension direction of the cell 2. In addition, the inflow cell 2a may be formed in a shape including a pentagon and a hexagon. However, it is desirable to form all inflow cells 2a in a pentagonal shape in a cross-section orthogonal to the extension direction of the cell 2 as shown in FIG. 4.

It is desirable that the open frontal area of the inflow cell be 60% or more. When the open frontal area of the inflow cell is smaller than 60%, there is a possibility that a capacity of accumulating soot or ash may decrease.

Here, the "open frontal area of the inflow cell" indicates the ratio of the "total area of the inflow cell" with respect to the sum of the "total area of the cell" and the "total area of the partition wall of the honeycomb structure body" in a cross-section orthogonal to the extension direction of the cell in the honeycomb structure body.

It is desirable that the hydraulic diameter of the outflow cell be 1.1 mm or more. When the hydraulic diameter of the outflow cell is smaller than 1.1 mm, there is a possibility that the initial pressure loss may increase.

Here, the "hydraulic diameter of the outflow cell" is a value calculated by the equation of 4×(the cross-sectional area of one outflow cell)/(the sum of the circumferential length in the cross-section of one outflow cell).

In the honeycomb structure 100, the value of the ratio of the distance Y with respect to the distance X is desirably 1.1 to 1.8 and more desirably 1.2 to 1.5. As described above, since the honeycomb structure provided with the inflow cell and the outflow cell has the value of the above-described ratio, the pressure loss is low at the initial timing and the pressure loss is low when a large amount of particulate matter such as soot or ash is accumulated even when the honeycomb structure is used in a truck or an off-road vehicle. Further, the honeycomb structure 100 can accumulate a large amount of particulate matter such as soot or ash. Further, a breakage caused by thermal stress is prevented. When the value of the above-described ratio is smaller than the lower limit value, it is difficult to accumulate a large amount of particulate matter such as soot or ash. When the value of the above-described ratio exceeds the upper limit value, the pressure loss obtained at the initial timing and the pressure loss obtained when a large amount of particulate matter such as soot or ash is accumulated increase.

As described above, the distance X indicates a short distance between the facing partition walls among the partition walls defining one outflow cell. In other words, the distance X can be regarded as a short length (here, a length excluding the thickness of the partition wall) of one side of the quadrangle outflow cell. In addition, when the "distance between the facing partition walls" is the same, that is, the cross-section orthogonal to the extension direction of the cell in the outflow cell is square, the "distance between the facing partition walls" becomes the distance X.

The above distance X is desirably from 1.2 mm to 2.4 mm and more desirably from 1.5 mm to 2.1 mm. At this time, in the rectangular shape, the upper limit value of the long-side length is 2.9 mm (which is a value corresponding to a desirable range) or 2.5 mm (which is a value corresponding to a more desirable range). When the distance X is smaller than the lower limit value, there is a possibility that the initial pressure loss may increase. As will be described later, when the distance exceeds the upper limit value, there is a possibility that the shape of the honeycomb formed body may not be easily maintained when the honeycomb formed body is formed by extrusion or the like.

The thickness of the partition wall is not particularly limited. For example, a range of 0.1 mm to 0.5 mm is desirable. When the thickness of the partition wall is smaller than 0.1 mm, there is a possibility that the heat capacity and the strength may be degraded. Meanwhile, when the thickness exceeds 0.5 mm, there is a possibility that the filtration area of the filter may decrease or the pressure loss may increase.

As a material of the partition wall, ceramic is desirable. Further, at least one of a group consisting of cordierite, silicon carbide, a silicon-silicon carbide-based composite material, mullite, alumina, aluminum titanate, silicon nitride, and a silicon carbide-cordierite based composite materials having an excellent strength and an excellent heat resistance is more desirable. Among these, cordierite is particularly desirable.

The honeycomb structure body may be a bonded body (a honeycomb segment bonding body) including a plurality of honeycomb segments. That is, the honeycomb structure body may include an aggregate of honeycomb segments and a bonding portion formed by a bonding material for bonding these honeycomb segments.

The honeycomb structure 100 may further include an outer circumferential wall 20 (see FIG. 1) in the side face of the honeycomb structure body 10.

[1-2] Plugging Portion:

The honeycomb structure of the invention includes an inflow side plugging portion and an outflow side plugging portion. As the material of the plugging portions, the same material as the partition wall as described above can be used.

Further, the depths of the inflow side plugging portion and the outflow side plugging portion can be appropriately determined.

[1-3] Catalyst:

The honeycomb structure of the invention may load a catalyst on the partition wall. Since the catalyst is loaded, $NO_x$, CO, HC, or the like to be emitted from a direct injection type gasoline engine or a diesel engine can be detoxicated. Further, PM accumulated on the surface of the partition wall can be easily removed by oxidizing and combusting.

As the type of catalyst, an SCR catalyst (zeolite, titania, vanadium) or a three-way catalyst including at least two noble metals selected from a group of Pt, Rh, and Pd and at least one of a group of alumina, ceria, and zirconia may be exemplified.

[2] Honeycomb Structure Manufacturing Method:

A honeycomb structure manufacturing method of the embodiment will be described. First, kneaded material for forming the honeycomb structure is formed so as to make a honeycomb formed body (a forming step). In this forming, the kneaded material can be extruded from a die so that the outflow cell has a quadrangle cross-section and all inflow cells surrounding the outflow cell have a pentagonal or hexagonal cross-section. Subsequently, a plugging process is performed on the obtained honeycomb formed body (or the honeycomb dried body dried if necessary) so as to form a plugging portion (an inflow side plugging portion and an outflow side plugging portion) (a plugging portion forming step). Subsequently, the honeycomb structure can be manufactured by firing (a honeycomb structure manufacturing step).

Hereinafter, the manufacturing steps will be described in more detail.

[2-1] Forming Step:

First, in a forming step, a ceramic forming raw material containing a ceramic raw material is formed so as to form a honeycomb formed body defining the plurality of cells used as fluid channels.

As the ceramic raw material contained in the ceramic forming raw material, a material including at least one of a group consisting of a cordierite forming raw material, cordierite, mullite, alumina, titania, silicon carbide, and aluminum titanate is desirable. In addition, the cordierite forming raw material indicates a ceramic raw material which is mixed in a chemical composition in which silica is contained in a range of 42 mass % to 56 mass %, alumina is contained in a range of 30 mass % to 45 mass %, and magnesia is contained in a range of 12 mass % to 16 mass % and becomes cordierite by firing.

It is desirable to prepare the ceramic forming raw material by mixing a dispersing medium, an organic binder, an inorganic binder, a pore former, a surfactant, or the like with the ceramic raw material. The composition ratio of the raw materials is not particularly limited. Here, it is desirable to use a composition ratio in accordance with the structure and the material of the desired honeycomb structure.

When the ceramic forming raw material is formed, the forming raw materials are first kneaded into kneaded material and the obtained kneaded material is formed in a honeycomb shape. A method of forming kneaded material by kneading the forming raw materials is not particularly limited. For example, a method using a kneader and a vacuum pugmill can be exemplified. A method of forming the honeycomb formed body by forming kneaded material is not particularly limited, and an existing forming method such as extrusion and injection molding can be used. For example, a method of forming the honeycomb formed body by extruding kneaded material through a die having a desired cell shape, a desired partition wall thickness, and a desired cell density can be exemplified as an appropriate example.

The shape of the honeycomb formed body is not particularly limited. For example, a round pillar shape and a polygonal pillar shape of which a cross-section orthogonal to the center axis has an oval shape, a racetrack shape, a triangular shape, a quadrangle shape, a pentagonal shape, a hexagonal shape, or an octagonal shape can be exemplified.

The obtained honeycomb formed body may be dried. The drying method is not particularly limited. However, for example, a hot air drying method, a micro wave drying method, a dielectric drying method, a decompression drying method, a vacuum drying method, a freeze drying method, and the like can be exemplified. Among theses, it is desirable to perform each of the dielectric drying method, the micro wave drying method, and the hot air drying method or a combination thereof.

[2-2] Plugging Portion Forming Step:

Next, a plugging portion is formed in the honeycomb formed body (the honeycomb dried body when the drying step is employed). Specifically, first, a masking process is performed so that the inflow cell is covered and the outflow cell is not covered in the inflow end face of the honeycomb formed body. Subsequently, the end (the inflow end) subjected to the masking process is immersed into plugging slurry. Then, the plugging slurry is charged into an open end of the outflow cell not subjected to the masking process. Subsequently, a masking process is performed on the outflow end face of the honeycomb formed body so that the inflow cell is not covered and the outflow cell is covered. Subsequently, the end (the outflow end) subjected to the masking process is immersed into the plugging slurry, and the plugging slurry is charged into the open end of the inflow cell not subjected to the masking process. In this way, the honeycomb formed body with the plugging portion can be obtained.

As the plugging slurry, an existing material used in the plugging portion of the honeycomb structure can be appropriately selected.

[2-3] Honeycomb Structure Manufacturing Step:

Next, a honeycomb structure is obtained by firing the obtained honeycomb formed body.

In addition, it is desirable to calcinate the honeycomb formed body before firing (main firing) the honeycomb formed body. The calcinating is performed for degreasing, and the method is not particularly limited. Here, the calcinating may be performed to remove an organic material (an organic binder, a dispersing agent, a pore former, or the like) inside the honeycomb formed body. In general, since the combustion temperature of the organic binder is about 100° C. to 300° C. and the combustion temperature of the pore former is about 200° C. to 800° C., it is desirable to perform a heating process for about 3 to 100 hours at about 200° C. to 1000° C. in the oxidizing atmosphere as the calcinating condition.

The honeycomb formed body may be fired (main firing) according to an appropriate condition. For example, when the cordierite forming raw material is used, the firing temperature is desirably from 1410° C. to 1440° C. Further, it is desirable to keep the firing time at the maximum temperature for 4 to 6 hours.

EXAMPLES

Hereinafter, the invention will be described in detail based on examples, but the invention is not limited to these examples.

Example 1

As a ceramic raw material, a material obtained by mixing silicon carbide (SiC) powder and metallic silicon (Si) powder at the mass ratio of 80:20 was prepared. Hydroxypropyl methylcellulose as a binder and water absorbable resin as a pore former were added to the mixed raw material and water was further added thereto so as to make a forming raw material. The obtained forming raw material was kneaded by a kneader so as to obtain kneaded material.

Next, the obtained kneaded material was formed by a vacuum extruder so as to make eighty eight square pillar-shaped honeycomb segments having a cell cross-section structure shown in FIG. 3. In the obtained honeycomb segment, the end face had a length of 36 mm and a width of 36 mm, and the length in the extension direction of the cell was 431.8 mm.

Next, the obtained honeycomb segment was dielectricly heated by a high-frequency wave so as to be dried and was dried for 2 hours at 120° C. by using a hot air dryer so as to obtain a honeycomb segment dried body.

Next, a plugging portion was formed in the obtained honeycomb segment dried body. First, a masking process was performed on one end face (the inflow end face) of the honeycomb segment dried body so that the inflow cell is covered and the outflow cell is not covered. Subsequently, the end subjected to the masking process was immersed into plugging slurry. In this way, the plugging slurry was charged to the open end of the cell (the outflow cell) not subjected to the masking process. Subsequently, a masking process was performed on the other end face (the outflow end face) of the honeycomb segment dried body so that the inflow cell is not covered and the outflow cell is covered. Subsequently, the end subjected to the masking process was immersed into plugging slurry. In this way, the plugging slurry was charged into the open end of the cell (the inflow cell) not subjected to the masking process. In this way, the plugging honeycomb segment dried body was obtained.

Then, a honeycomb segment fired body was obtained by degreasing and firing the obtained plugging honeycomb segment dried body. The degreasing was performed at 400° C. for 5 hours. Further, the firing was performed at 1450° C. for 2 hours at the atmosphere of argon.

Eighty eight honeycomb segment fired bodies were bonded and integrated by a bonding material so as to obtain a square pillar-shaped honeycomb segment bonded body. The bonding material included an inorganic particle and an inorganic adhesive as a main component and also included an organic binder, a surfactant, foamable resin, water, and the like other than the main components. Subsequently, grinding was performed on the outer circumference of the obtained square pillar-shaped honeycomb segment bonded body so that the honeycomb segment bonded body was formed in a round pillar shape. Subsequently, a coating material was applied on the outer circumferential face of the round pillar-shaped honeycomb segment bonding body so as to obtain a honeycomb structure. The honeycomb structure was formed so as to have an end face of a diameter of 355.6 mm. As the coating material, a material including ceramic powder, water, and a binding agent was used.

In the honeycomb structure used herein, the cell was disposed as shown in FIG. 3 in a cross-section orthogonal to the extension direction of the cell. Further, the thickness of the partition wall was 0.18 mm. The distance X was 1.6 mm. The distance Y was 1.8 mm. The value (Y/X) of the ratio of the distance Y with respect to the distance X was 1.1. The open frontal area of the inflow cell was 60%. Then, the hydraulic diameter of the outflow cell was 1.4 mm.

The obtained honeycomb structure was evaluated as an "initial pressure loss", a "PM accumulation pressure loss", an "ash accumulation", a "cracking margin", and an "overall evaluation" by the following method. The result is shown in Table 1.

(Initial Pressure Loss (kPa))

Air of 300° C. was caused to flow to the honeycomb structure (the filter) at 50 $Nm^3$/minute, a pressure difference between an inflow side and an outflow side was calculated, and an initial pressure loss was measured from the calculated value. A case in which the pressure loss was 10 kPa or more was indicated by "D", a case in which the pressure loss was equal to or larger than 9 kPa and smaller than 10 kPa was indicated by "C", a case in which the pressure loss was equal to or larger than 8 kPa and smaller than 9 kPa was indicated by "B", and a case in which the pressure loss was smaller than 8 kPa was indicated by "A". The result is shown in Table 1.

In addition, in the evaluation of the initial pressure loss, in the case of "D", the ratio of the initial pressure loss was high by 10% or more compared with a case where the cell structure was "square" (see Table 1). For that reason, the case of "D" was not proper. In the case of "C", the initial pressure loss was low compared with a case where the cell structure was "square", but no big problem occurred practically. For that reason, the case of "C" was satisfactory. The case of "B" was more excellent compared with a case where the cell structure was "square". For that reason, the case of "B" was more satisfactory. In the case of "A", the ratio of the initial pressure loss was low by 10% or more compared with a case where the cell structure was "square". For that reason, the case of "A" was particularly satisfactory. In addition, as will be described later, the "square" indicates a state where each of the inflow cell and the outflow cell has a quadrangle cross-section and the inflow cell and the outflow cell are alternately disposed.

(PM Accumulation Pressure Loss (kPa))

Soot was generated by burning diesel oil in an oxygen lack state and dilution air was added to a combustion gas of soot generation amount at 50 g/hour and of 300° C. at a flow rate of 50 Nm³/minute. Thus, the soot containing combustion gas was caused to flow to the honeycomb structure. When soot was accumulated inside the honeycomb structure by 4 g/L, a pressure loss between an inflow side and an outflow side was calculated, and the PM accumulation pressure loss was measured from the calculated value. A case in which the pressure loss was 17 kPa or more was indicated by "D". A case in which the pressure loss was equal to or larger than 15 kPa and smaller than 17 kPa was indicated by "C". A case in which the pressure loss was equal to or larger than 13 kPa and smaller than 15 kPa was indicated by "B". A case in which the pressure loss was smaller than 13 kPa was indicated by "A". The result is shown in Table 1.

In addition, in the evaluation of the PM accumulation pressure loss, in the case of "D", the pressure loss was high by 10% or more compared with a case where the cell structure was "square". For that reason, the case of "D" was not proper. In the case of "C", the pressure loss was low compared with a case where the cell structure was "square", but no big problem occurred practically. For that reason, the case of "C" was satisfactory. The case of "B" is more excellent compared with a case where the cell structure was "square". For that reason, the case of "B" was more satisfactory. In the case of "A", the pressure loss was low by 10% or more compared with a case where the cell structure was "square". For that reason, the case of "A" was particularly satisfactory.

(Ash Accumulation)

The weight of a filter was measured in advance, and the filter was mounted on an exhaust system of a diesel engine having a displacement of 18 L for a traveling test. Then, ash was accumulated on the filter and a change in pressure loss was measured. The weight of the filter was measured when the pressure loss increased by 5 kPa compared with the initial pressure loss. By a method of calculating a difference in weight compared with a weight obtained before a test and dividing the calculated value by the volume of the filter, the ash accumulation amount (the ash accumulation ratio) per volume (L) of the filter when the pressure loss increased by 5 kPa was obtained. In Table 1, the "ash accumulation" was recorded. The evaluation of the ash accumulation ratio was performed based on the followings. A mark "A" was given if the ash accumulation ratio was 40 g/L or more when the pressure loss increased by 5 kPa compared with the initial pressure loss. A mark "B" was given if the ash accumulation ratio was equal to or larger than 35 g/L and smaller than 40 g/L. A mark "C" was given if the ash accumulation ratio was equal to or larger than 30 g/L and smaller than 35 g/L. A mark "D" was given if the ash accumulation ratio was smaller than 30 g/L. The result is shown in Table 1.

In addition, in the evaluation of the ash accumulation ratio, in the case of "A", the ash accumulation ratio was 1.5 times or more compared with a case where the cell structure was "square". For that reason, the case of "A" was particularly satisfactory. In the case of "B", the ash accumulation ratio was 1.25 times or more compared with a case where the cell structure was "square". For that reason, the case of "B" was more satisfactory. In the case of "C", the ash accumulation ratio increased compared with a case where the cell structure was "square". For that reason, the case of "C" was satisfactory. In the case of "D", the ash accumulation ratio was small compared with a case where the cell structure was "square". For that reason, the case of "D" was not proper.

(Cracking Margin)

A filter was mounted on an exhaust system of a diesel engine having a displacement of 18 L and soot was accumulated on the filter. Next, the exhaust gas temperature was increased to 650° C. at 2° C./second. Subsequently, the gas flow rate was rapidly decreased by shifting the condition to the idling operation. With such a condition, the filter was regenerated. The soot accumulation ratio inside the filter was gradually increased and the test (involved with the regeneration of the filter) was repeated. Then, the maximum soot accumulation ratio in which the filter was not cracked was examined. The soot accumulation ratio at this time was set as the "cracking margin". A case in which the cracking margin was smaller than 6 g/L was indicated by "D". A case in which the cracking margin was equal to or larger than 6 g/L and smaller than 7 g/L was indicated by "C". A case in which the cracking margin was equal to or larger than 7 g/L and smaller than 8 g/L was indicated by "B". A case in which the cracking margin was equal to or larger than 8 kPa was indicated by "A". The result is shown in Table 1.

In addition, in the evaluation of the cracking margin, in the cases of "A" to "C", the cracking margin was high compared with a case where the cell structure was "square". For that reason, the cases of "A" to "C" were satisfactory. Meanwhile, in the case of "D", the cracking margin was low compared with a case where the cell structure was "square". For that reason, the case of "D" was not proper.

(Overall Evaluation)

Among four evaluation marks (A to D) obtained from the above four items, an evaluation having the largest number of evaluation items was set as the overall evaluation. For example, when the above four evaluation items were "A, B, C, A", the overall evaluation was "A". Then, when the evaluation items were the same in two evaluations, the evaluation of the "ash accumulation" was set as the overall evaluation. For example, when the above four evaluation items were "A, A, B, B" and the evaluation of the ash accumulation was "B", the overall evaluation was "B". However, when any one of the four evaluation items was "D", the overall evaluation was "D". The result is shown in Table 1.

In Table 1, the "cell structure" indicates the shape and the arrangement of the inflow cell and the outflow cell, and the "square" indicates a state where the inflow cell and the outflow cell have quadrangle cross-sections and the inflow cell and the outflow cell are alternately disposed. In Table 1, the "cell pitch" indicates the length of one side of the inflow cell and the outflow cell each having a quadrangle cross-section. "FIG. 3" shows a state where the inflow cell and the outflow cell are formed according to the shape and the arrangement shown in FIG. 3. That is, the outflow cell having a quadrangle cross-section and the inflow cell having a pentagonal cross-section surrounding the outflow cell are disposed. Further, "FIG. 4" shows a state where the inflow cell and the outflow cell are formed according to the shape and the arrangement shown in FIG. 4. That is, the outflow cell having a quadrangle cross-section and the inflow cell having a hexagonal cross-section surrounding the outflow cell are disposed.

TABLE 1

| | Cell Structure | Thickness of partition wall [mm] | X [mm] | Y [mm] | Y/X | Cell pitch [mm] | Open frontal area of inflow cell [%] | Hydraulic diameter of outflow cell [mm] | Initial pressure loss | Pressure loss in PM accumulation state | Ash accumulation | Cracking margin | Overall evaluation |
|---|---|---|---|---|---|---|---|---|---|---|---|---|---|
| Comparative Example 1 | Square | 0.18 | — | — | — | 1.5 | 47 | 1.2 | B | B | D | D | D |
| Comparative Example 2 | FIG. 3 | 0.18 | 1.7 | 1.7 | 1.0 | — | 57 | 1.5 | A | A | D | B | D |
| Example 1 | FIG. 3 | 0.18 | 1.6 | 1.8 | 1.1 | — | 60 | 1.4 | A | A | B | B | B |
| Example 2 | FIG. 3 | 0.18 | 1.5 | 1.9 | 1.3 | — | 63 | 1.3 | A | A | B | B | B |
| Example 3 | FIG. 3 | 0.18 | 1.4 | 2.0 | 1.5 | — | 65 | 1.2 | B | A | A | A | A |
| Example 4 | FIG. 3 | 0.18 | 1.3 | 2.2 | 1.7 | — | 67 | 1.1 | C | B | B | A | B |
| Comparative Example 3 | FIG. 3 | 0.18 | 1.2 | 2.3 | 1.9 | — | 69 | 1.0 | D | C | B | A | D |
| Comparative Example 4 | FIG. 3 | 0.26 | 2.2 | 2.2 | 1.0 | — | 58 | 1.9 | A | A | D | A | D |
| Example 5 | FIG. 3 | 0.26 | 2.1 | 2.3 | 1.1 | — | 60 | 1.8 | A | A | C | A | A |
| Example 6 | FIG. 3 | 0.26 | 2.0 | 2.4 | 1.2 | — | 62 | 1.7 | A | A | B | A | A |
| Example 7 | FIG. 3 | 0.26 | 1.9 | 2.5 | 1.3 | — | 64 | 1.6 | A | A | A | A | A |
| Example 8 | FIG. 3 | 0.26 | 1.8 | 2.6 | 1.4 | — | 65 | 1.5 | A | A | A | A | A |
| Example 9 | FIG. 3 | 0.26 | 1.7 | 2.7 | 1.6 | — | 67 | 1.4 | B | A | B | A | B |
| Example 10 | FIG. 3 | 0.26 | 1.6 | 2.8 | 1.7 | — | 68 | 1.3 | B | B | B | A | B |
| Comparative Example 5 | FIG. 3 | 0.26 | 1.5 | 2.9 | 1.9 | — | 70 | 1.2 | D | C | A | A | D |
| Example 11 | FIG. 4 | 0.18 | 1.5 | 1.9 | 1.3 | — | 69 | 1.3 | A | B | A | B | A |
| Example 12 | FIG. 4 | 0.26 | 1.6 | 2.8 | 1.7 | — | 74 | 1.3 | C | C | C | A | C |
| Example 13 | FIG. 3 | 0.26 | 1.7 | 2.0 | 1.2 | — | 59 | 1.4 | B | C | C | B | C |
| Example 14 | FIG. 3 | 0.18 | 1.2 | 1.7 | 1.4 | — | 61 | 1.0 | C | B | B | B | B |
| Example 15 | FIG. 3 | 0.10 | 1.1 | 1.3 | 1.1 | — | 66 | 1.1 | C | A | B | B | B |
| Example 16 | FIG. 3 | 0.26 | 2.5 | 2.8 | 1.1 | — | 62 | 2.2 | A | B | B | A | B |

Examples 2 to 16 and Comparative Examples 1 to 5

The evaluation of "initial pressure loss", the "PM accumulation pressure loss", the "ash accumulation", the "cracking margin", and the "overall evaluation" were performed similarly to Example 1 except for the modification shown in Table 1. The result is shown in Table 1.

From Table 1, it is proved that the honeycomb structures of Examples 1 to 16 are different from the honeycomb structures of Comparative Examples 1 to 5 in that the pressure loss is low even at an initial timing and a timing in which a large amount of soot is accumulated and a large amount of soot can be accumulated. Further, it is proved that the breakage caused by thermal stress is prevented in the honeycomb structures of Examples 1 to 16.

The honeycomb structure of the invention can be used as a filter that purifies an exhaust gas emitted from a truck or an off-road vehicle.

DESCRIPTION OF REFERENCE NUMERALS

1: partition wall, 2: cell, 2a: inflow cell, 2b: outflow cell, 3: inflow side plugging portion, 4: outflow side plugging portion, 10: honeycomb structure body, 11: inflow end face, 12: outflow end face, 15: cell group, 17: defining wall, 20: outer circumferential wall, 100: honeycomb structure

What is claimed is:

1. A honeycomb structure comprising:
   a honeycomb structure body having a plurality of porous partition walls defining a plurality of cells as fluid channels extending from an inflow end face as one end face to an outflow end face as the other end face;
   an inflow side plugging portion which is disposed in an end at the side of the inflow end face of a predetermined cell; and
   an outflow side plugging portion which is disposed in an end at the side of the outflow end face of a residual cell,
   wherein the plurality of cells includes an outflow cell having the inflow side plugging portion disposed therein and an inflow cell having the outflow side plugging portion disposed therein,
   a cross-section of the outflow cell orthogonal to the extension direction of the plurality of cells is quadrangle,
   a plurality of inflow cells are disposed so as to surround the entire circumference of the outflow cell and a cross-section of the inflow cells orthogonal to the extension direction of the plurality of cells is pentagonal or hexagonal, and
   when a distance X indicates a shortest distance between facing partition walls among the partition walls defining one outflow cell and a distance Y indicates a distance between partition walls defining adjacent outflow cells while the partition walls face each other in a cross-section orthogonal to the extension direction of the plurality of cells, a value of a ratio of the distance Y with respect to the distance X is 1.2 to 1.8.

2. The honeycomb structure according to claim 1, wherein a cross-section of the plurality of inflow cells orthogonal to the extension direction of the plurality of cells is pentagonal.

3. The honeycomb structure according to claim 1, wherein a cross-section of the outflow cell orthogonal to the extension direction of the plurality of cells is square.

4. The honeycomb structure according to claim 2, wherein a cross-section of the outflow cell orthogonal to the extension direction of the plurality of cells is square.

5. The honeycomb structure according to claim 1, wherein an open frontal area of the inflow cells is 60% or more.

6. The honeycomb structure according to claim 2, wherein an open frontal area of the inflow cells is 60% or more.

7. The honeycomb structure according to claim 3, wherein an open frontal area of the inflow cells is 60% or more.

8. The honeycomb structure according to claim 4, wherein an open frontal area of the inflow cells is 60% or more.

9. The honeycomb structure according to claim 1, wherein a hydraulic diameter of the outflow cell is 1.1 mm or more.

10. The honeycomb structure according to claim 1, wherein the distance X is 1.2 mm to 2.4 mm.

11. The honeycomb structure according to claim 1, wherein a catalyst is loaded on the partition wall.

* * * * *